United States Patent
Kim et al.

(10) Patent No.: US 8,238,489 B2
(45) Date of Patent: Aug. 7, 2012

(54) APPARATUS AND METHOD FOR PROCESSING SIGNAL USING SINGLE CORRELATOR

(75) Inventors: Hwi Kim, Seoul (KR); Sung Hyuck Im, Seoul (KR); Gyu In Jee, Gyeonggi-Do (KR)

(73) Assignee: Core Logic, Inc., Seoul (KR)

( * ) Notice: Subject to any disclaimer, the term of this patent is extended or adjusted under 35 U.S.C. 154(b) by 782 days.

(21) Appl. No.: 12/388,496

(22) Filed: Feb. 18, 2009

(65) Prior Publication Data
US 2009/0207951 A1    Aug. 20, 2009

(30) Foreign Application Priority Data
Feb. 19, 2008   (KR) .................. 10-2008-0014971

(51) Int. Cl.
*H04L 27/06* (2006.01)
(52) U.S. Cl. ........ 375/343; 375/316; 375/147; 375/149; 375/150; 375/152
(58) Field of Classification Search .................. 375/343, 375/316, 147, 149, 150, 152
See application file for complete search history.

(56) References Cited

U.S. PATENT DOCUMENTS

| | | | |
|---|---|---|---|
| 6,636,178 B2 * | 10/2003 | Gronemeyer | 342/378 |
| 6,724,807 B1 * | 4/2004 | Krasner et al. | 375/143 |
| 8,013,789 B2 * | 9/2011 | Van Graas et al. | 342/357.46 |
| 2010/0074308 A1 | 3/2010 | Young | |

FOREIGN PATENT DOCUMENTS
WO       2008138891 A2    11/2008

\* cited by examiner

*Primary Examiner* — Siu Lee
(74) *Attorney, Agent, or Firm* — The Nath Law Group; Joshua B. Goldberg

(57) ABSTRACT

An apparatus and method for processing a signal using a single correlator are provided. The apparatus may include a first storage unit storing satellite signal samples, a correlator receiving the satellite signal samples stored in the first storage unit in units of at least two satellite signal samples and performing correlation, and a controller storing the satellite signal samples received from an RF terminal in the first storage unit and controlling the correlator based on a predetermined control value. Accordingly, it is possible to ensure speed and performance even when tracking a plurality of satellite signals using a single correlator.

14 Claims, 5 Drawing Sheets

APPARATUS AND METHOD FOR PROCESSING SIGNAL USING SINGLE CORRELATOR

CROSS-REFERENCE TO RELATED APPLICATION

This application claims under 35 U.S.C. §119(a) the benefit of Korean Patent Application No. 10-2008-0014971 filed on Feb. 19, 2008, the entire contents of which are incorporated herein by reference.

BACKGROUND OF THE INVENTION (a) Technical Field

The present invention relates to an apparatus and method for processing a signal using a single correlator and, more particularly, to technology related to a Global Positioning System (GPS) whose speed and performance can be ensured even when tracking a plurality of satellite signals using a single correlator.

(b) Background Art

A Global Positioning System (GPS) is a position measurement system providing position information using satellites in geostationary orbits. The GPS was originally developed for military purposes, but has been widely used in various fields since the year 2000 when the intentional adding of noise known as Selective Availability (SA) was removed. The GPS uses the same frequency band in different codes by the code division multiple access (CDMA) method.

In the GPS, a GPS receiver capable of measuring three-dimensional position and time using at least four satellites comprises an antenna for receiving satellite signals, an RF unit for demodulating a necessary signal from the satellite signals received by the antenna, a signal processor for down-converting the signal passing through the RF unit to baseband, and a user interface. Research aimed at further developing the signal processor down-converting a received signal to baseband continues to progress in the direction of increased channels and reduced size, and this trend will continue.

The core of the signal processor of the GPS receiver is a correlator, and various performance indexes of the GPS are set according to the structure of the correlator. The GPS correlator receives a signal passing through an RF terminal, down-converts the received signal into a baseband signal, and despreads the baseband signal to restore data. For example, the satellite signal is down-converted into an intermediate frequency at the RF terminal, quantized to 2 bits, and then input to the correlator. The correlator down-converts the input signal into a baseband signal, multiplies the baseband signal by a pseudo noise code, and integrates the resulting signal. As shown in FIG. 1, the GPS receiver includes 12 to 16 correlators such that one correlator is assigned to each satellite to extract one measured value.

In the case where the plurality of correlators are used in the GPS receiver, signal acquisition speed is high but so is power consumption, and it is necessary to increase the integration of the chip. Moreover, since each correlator possesses a fixed signal tracking channel, it occupies hardware resources, and thus resource efficiency decreases due to the fixed structure.

Moreover, the correlator of the conventional GPS receiver operates repeatedly each time sampling is performed in synchronization with a sampling frequency. However, since various components capable of operating at high speed have been developed, it is possible to implement a correlator capable of operating at a speed several to several tens of times faster than the existing sampling frequency. Therefore, a plan for implementing and effectively utilizing a correlator capable of operating at high speed is urgently required.

SUMMARY OF THE INVENTION

The present invention has been made in an effort to solve the above-described problems associated with the conventional technology. Accordingly, the present invention provides an apparatus and method for processing a signal using a single correlator whose speed and performance can be ensured even when tracking a plurality of satellite signals using a single correlator, thus reducing the number of hardware components for correlation in a digital terminal and increasing resource efficiency.

In one aspect, the present invention provides a signal processing apparatus including: a first storage unit storing satellite signal samples; a correlator receiving the satellite signal samples stored in the first storage unit in units of at least two satellite signal samples and performing correlation; and a controller storing the satellite signal samples received from an RF terminal in the first storage unit and controlling the correlator based on a predetermined control value.

The correlator may include a clock generator generating a carrier replica signal. The clock generator may first calculate a phase value corresponding to any one of the at least two satellite signal samples, and then calculate phase values corresponding to the other satellite signal samples using the calculated phase value to generate the carrier replica signals corresponding to the at least two satellite signal samples.

The clock generator may generate the carrier replica signals using the calculated phase values corresponding to the satellite signal samples and a starting phase value set by the controller.

The clock generator may calculate the phase values corresponding to the other satellite signal samples by sequentially adding the calculated phase value corresponding to any one of the satellite signal samples.

The correlator may include: a clock generator generating a code clock signal; and a pseudo noise code generator generating a pseudo noise code replica signal using the code clock signal generated by the clock generator and the starting phase value set by the controller.

The clock generator may first calculate a phase value corresponding to any one of the at least two satellite signal samples, and then calculate phase values corresponding to the other satellite signal samples using the calculated phase value to generate the code clock signal.

The clock generator may calculate the phase values corresponding to the other satellite signal samples by sequentially adding the calculated phase value corresponding to any one of the satellite signal samples.

The apparatus for processing a signal may further include a second storage unit storing the control value input from an external controller.

The control value may include: information for setting units of processing and units of storage of the first storage unit; and information for controlling the clock generator included in the correlator to track signals transmitted from a plurality of satellites.

The controller may change a satellite signal channel of the correlator in each period of a pseudo noise code.

The first storage unit may include a plurality of memory buffers temporarily storing the satellite signal samples alternately in each period of a pseudo noise code.

In another aspect, the present invention provides a signal processing method including the steps of: setting a control value for tracking a signal of a satellite; storing satellite signal samples received from an RF terminal in a buffer in units of at least two satellite signal samples based on the control value; performing correlation by outputting the satellite signal samples in units of at least two satellite signal samples from the buffer; and changing a signal channel upon completion of the correlation to track a signal of another satellite.

The step of setting the control value may include the step of storing information, received from an external controller, for setting units of processing and units of storage of the buffer and information for the correlation in a storage unit.

The step of performing the correlation may include the steps of: generating a clock signal for the at least two satellite signal samples output from the buffer; generating a carrier replica signal and a pseudo noise code replica signal based on the generated clock signal; and mixing the generated carrier replica signal and pseudo noise code replica signal with the at least two satellite signal samples and integrating the mixed signal.

The step of generating the clock signal may include the steps of: calculating a phase value corresponding to any one of the at least two satellite signal samples; and calculating phase values corresponding to the other satellite signal samples using the calculated phase value.

The method for processing a signal may further include the step of repeating the step of setting the control value, the step of storing the satellite signal samples, the step of performing the correlation, and the step of changing the signal channel, while changing the signal channel for each satellite, in order to track signals of all satellites.

It is to be understood that both the foregoing summary and the following detailed description of the present invention concern exemplary embodiments intended only to further understanding of the invention as claimed.

BRIEF DESCRIPTION OF THE DRAWINGS

The above and other objects, features and advantages of the present invention will become more apparent from the following detailed description of exemplary embodiments of the invention made with reference to the accompanying drawings, of which.

DETAILED DESCRIPTION

Figure 1:
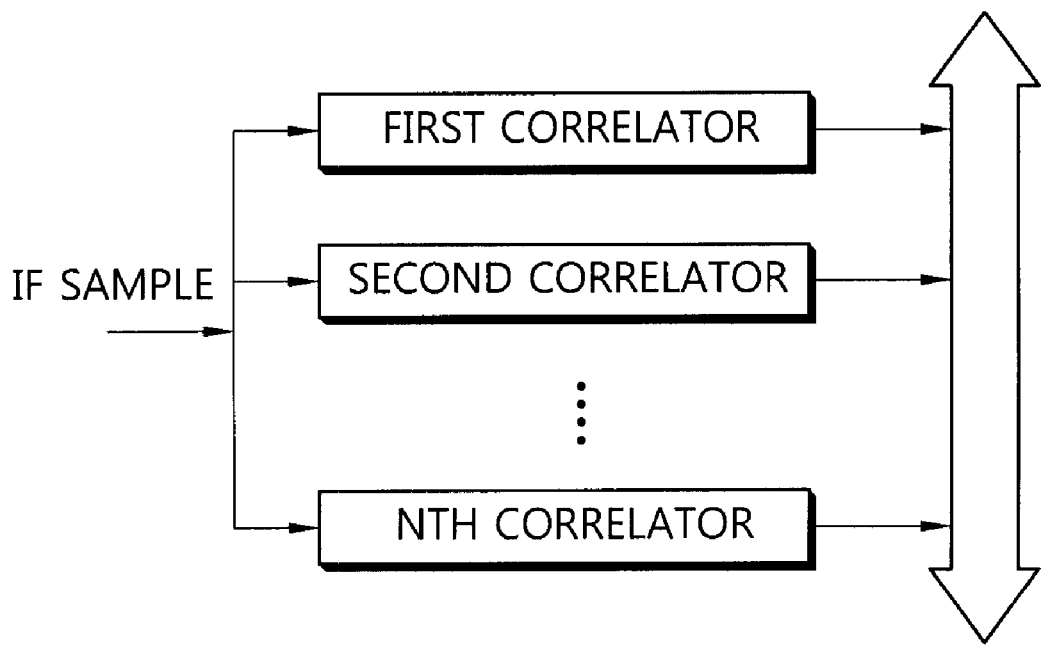
FIG. 1 is a block diagram showing a configuration of a signal processor in a conventional GPS receiver.

The present invention will now be described more fully hereinafter with reference to the accompanying drawings, in which exemplary embodiments of the invention are shown. This invention may, however, be embodied in many different forms and should not be construed as limited to the exemplary embodiments set forth herein. Whenever elements appear in the drawings or are mentioned in the specification, they are always denoted by the same reference numerals.

Figure 2:
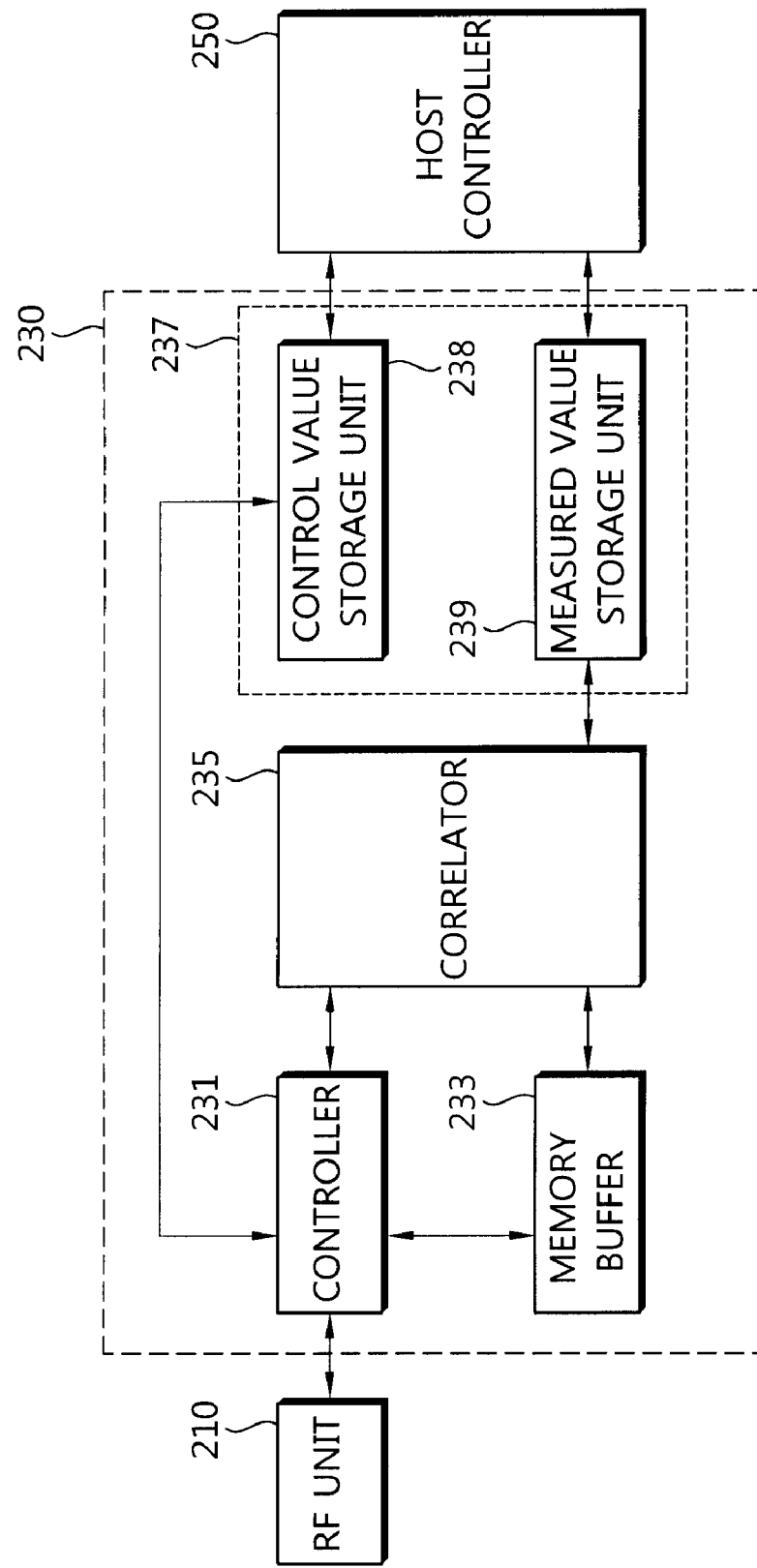
FIG. 2 is a block diagram showing a configuration of a GPS receiver including a signal processor in accordance with an exemplary embodiment of the present invention.

FIG. 2 is a block diagram showing a configuration of a GPS receiver including a signal processor in accordance with an exemplary embodiment of the present invention.

As shown in FIG. 2, the GPS receiver may include an RF unit 210, a signal processor 230, and a host controller 250.

The RF unit 210 may receive a satellite signal transmitted from a satellite through an antenna, down-convert the received signal into an intermediate frequency (IF) signal, sample the IF signal, and output an IF sample of 2 bits, i.e., a satellite signal sample.

The RF unit 210 may perform a sampling operation with a specific sampling frequency, e.g., a sampling frequency of 16.368 MHz. Of course, the sampling frequency used at the RF unit 210 for the sampling operation is not limited thereto, but may be modified in various ways according to the operation environment. However, in the present embodiment, it is assumed that the RF unit 210 performs the sampling operation with the sampling frequency of 16.368 MHz.

The signal processor 230 may perform the functions of processing the satellite signal sample input from the RF unit 210 in units of predetermined blocks according to a control value input from the host controller 250, and calculating a signal tracking value for each satellite.

Preferably, the signal processor 230 may calculate a satellite signal tracking value by changing a signal channel to another satellite signal channel in each period of a pseudo noise code (PN code), in order to calculate the signal tracking values of all satellites. For example, the signal processor 230 may include a single correlator 235 processing the satellite signal sample in units of predetermined blocks. The correlator 235 changes the signal channel to another satellite signal channel in each period of the PN code to track the satellite signals transmitted from all satellites and output the tracking values.

The PN code may be a code sequence with a specific rule and noise characteristics similar to a random sequence and capable of reproduction. The PN code includes a clear and acquisition (C/A) code, a Walsh code, etc. In the present embodiment, the C/A code is used as the PN code and will be described below as the PN code; however, the present invention is not limited thereto.

The host controller 250 may calculate control values to allow the signal processor 230 to track the satellite signals transmitted from all satellites by changing the signal channel and store the control values in a storage unit 237 of the signal processor 230. Preferably, the host controller 250 may calculate the control values in each period of the C/A code and store the control values in the storage unit 237 of the signal processor 230.

The control values may include a memory buffer control value and a correlator control value. The memory buffer control value may represent information for setting units of processing and units of storage of a memory buffer 233. Moreover, the correlator control value may represent a control value for controlling a clock generator included in the correlator 235 of the signal processor 230, and may be a control value of the clock generator for allowing the correlator 235 to track a satellite signal of each satellite.

Next, the configuration of the signal processor 230 will be described in more detail.

As shown in FIG. 2, the signal processor 230 may include a controller 231, the memory buffer 233, the single correlator 235, and the storage unit 237.

The storage unit 237 may store the unit of processing and the unit of storage of the memory buffer 233 input from the host controller 250, and the control value of the clock generator for allowing the correlator 235 to track a satellite signal for each satellite. Moreover, the storage unit 237 may store correlation values output from the correlator 235, i.e., the signal tracking values for all satellites.

The storage unit 237 may include a control value storage unit 238 storing the control values, and a measured value storage unit 239 storing the output values of the correlator 235. The control value storage unit 238 may store the memory buffer control value and the correlator control value input from the host controller 250. Moreover, the measured value storage unit 239 may store the correlation values output from the correlator 235, i.e., the signal tracking values for all satellites.

The storage unit 237 may be physically implemented as a single storage medium (e.g., a resistor). In this case, the storage area of the storage unit 237 may be divided into the control value storage unit 238 and the measured value storage unit 239. However, there is no limitation here and the control value storage unit 238 and the measured value storage unit 239 may be implemented as physically separate storage media. It will be appreciated that the present invention includes these two cases.

The controller 231 controls the memory buffer 233 and the correlator 235 based on the control values such as the memory buffer control value and the correlator control value stored in the control value storage unit 238.

In detail, the controller 231 may set the unit of storage of the memory buffer 233 based on the unit of storage of the memory buffer stored in the control value storage unit 238, and store the satellite signal sample input from the RF unit 210 in the memory buffer 233 based on the unit of processing of the memory buffer stored in the control value storage unit 238.

For example, assuming that the sampling frequency of the RF unit 210 is 16.368 MHz and the period of the C/A code is 1 ms, the number of samples corresponding to the period of the C/A code is 16,368. In this case, the controller 231 may set 16,384, which is a power of 2 ($2^n$ where n is an integer greater than 1) and enables storage of 16,368 samples, as the unit of storage of the memory buffer 233.

The controller 231 may control parameters of the clock generator (digital controlled oscillator, DCO) of the correlator 235 based on the correlator control value stored in the control value storage unit 238.

Meanwhile, it is preferable that a plurality of memory buffers 233 be provided. Each of the plurality of memory buffers 233 may alternately load the satellite signal samples input from the RF unit 210 in the units of processing. In this case, the correlator 235 alternately selects the plurality of memory buffers 233 with a predetermined period, receives the satellite signal samples from the selected memory buffer 233 in the units of processing, and processes the signal samples.

For example, in the case where two memory buffers 233 are provided, the first memory buffer 233 loads 16,384 satellite signal samples during one period of the C/A code, and the second memory buffer 233 loads the following 16,384 satellite signal samples while the satellite signal samples are processed by the correlator 235. During the following period of the C/A code, the correlator 235 processes the satellite signal samples loaded in the second memory buffer 233 and, at the same time, the first memory buffer 233 loads the satellite signal samples. As such, the two memory buffers 233 alternately load the satellite signal samples and output the satellite signal samples to the correlator 235.

The correlator 235 requests and receives the satellite signal samples in predetermined units of processing from the memory buffer 233. Moreover, the correlator 235 removes the carrier based on the satellite signal channel set value of the controller 231, removes the C/A code, integrates the resulting signal, and outputs a correlation value. At this time, the correlator 235 requests and receives the satellite signal samples in units of predetermined blocks (e.g., 8 bits) from the memory buffer 233. Moreover, the correlator 235 outputs the correlation value for each satellite signal in each period of the C/A code as the satellite signal channel is changed by the controller 231 in each period of the C/A code.

The correlator 235 is capable of operating at high speed and may be a high-performance correlator which uses an internal operation clock with a frequency several to several tens of times (or more) higher than the sampling frequency used in the sampling operation of the satellite signal samples.

The measured value storage unit 239 stores the correlation values output from the correlator 235. For example, the measured value storage unit 239 may store signal tracking values for all satellites. The host controller 250 reads the signal tracking values from the measured value storage unit 239 and transmits the read values to a processor. Then, the processor calculates the position of the GPS receiver using the signal tracking values.

Figure 3:
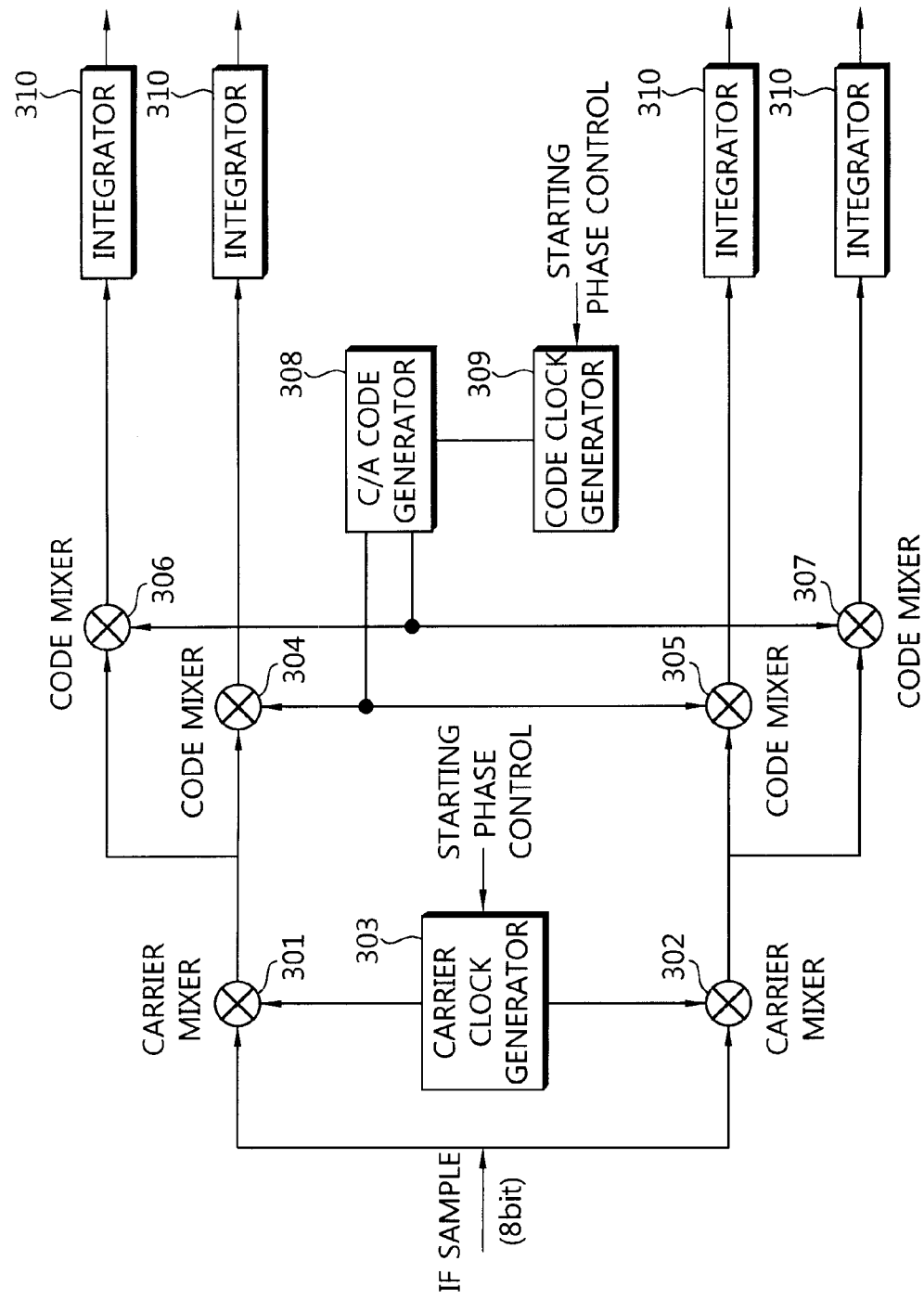
FIG. 3 is a schematic diagram showing a configuration of a correlator included in the signal processor of FIG. 2.

FIG. 3 is a schematic diagram showing a configuration of the correlator included in the signal processor 230 of FIG. 2.

As shown in FIG. 3, the correlator 235 of FIG. 2 may include a carrier clock generator 303, carrier mixers 301 and 302, a code clock generator 309, a C/A code generator 308, code mixers, 304, 305, 306, and 307, and integrators 310.

First, the memory buffer 233 inputs the IF samples, i.e., the satellite signal samples, in units of blocks, i.e., in units of four samples to the carrier mixers 301 and 302. The carrier mixers 301 and 302 mix the four input satellite signal samples with a carrier code replica signal generated by the carrier clock generator 303. At this time, the carrier clock generator 303 may provide in-phase (I) and quadrature (Q) signals for the four satellite signal samples to the carrier mixers 301 and 302 according to a starting phase set by the controller 231.

The signals mixed with the carrier code replica signal by the carrier mixers 301 and 302 are inputted to the code mixers 304, 305, 306, and 307 and then mixed with C/A code replica signals generated by the C/A code generator 308. The C/A code generator 308 generates the C/A code replica signals for the four samples according to the starting phase set by the controller 231 and the code clock signal generated by the code clock generator 309. For example, when the sampling frequency of 16.368 MHz is used in the RF 210, the number of cases of the C/A codes may be 8, such as 0000, 1000, 1100, 1110, 0111, 0011, 0001, and 1111.

In detail, when the C/A code generator 308 generates the C/A code replica signals for the four satellite signal samples, it may generate a prompt code signal and early/late code signals delayed by a predetermined unit. Then, the C/A code generator 308 may provide the prompt code signal to the code mixers 304 and 305 and provide one of the early, late, or early-minus-late signals to the code mixers 306 and 307.

Meanwhile, in order to generate the carrier replica signals and the code clock signals corresponding to the four satellite signal samples, the carrier clock generator 303 and the code clock generator 309 may first calculate a phase value corresponding to one of the four satellite signal samples, and then calculate phase values corresponding to the other three satellite signal samples using the calculated phase value.

For example, in order to generate the carrier replica signals corresponding to the four satellite signal samples such as a first satellite signal sample, a second satellite signal sample, a third satellite signal sample, and a fourth satellite signal sample, the carrier clock generator 303 may first calculate a first phase value corresponding to the first satellite signal sample. Subsequently, the carrier clock generator 303 may calculate a second phase value corresponding to the second satellite signal sample by adding the first phase value to the calculated first phase value. In this manner, a third phase value corresponding to the third satellite signal sample may be calculated by adding the first phase value to the second phase value, and a fourth phase value corresponding to the fourth satellite signal sample may be calculated by adding the first phase value to the third phase value. That is, in order to calculate the phase values corresponding to the four satellite signal samples, the first phase value corresponding to the first satellite signal sample is first calculated, and then the phase values corresponding to the other satellite signal samples are calculated by sequentially adding the first phase value.

The carrier clock generator 303 may calculate phase values of the four carrier replica signals corresponding to the four satellite signal samples by adding the calculated first to fourth phase values to a starting phase value set by the controller 231.

In the same manner, in order to generate the code clock signals corresponding to the four satellite signal samples such as the first to fourth satellite signal samples, the code clock generator 309 may first calculate a first phase value corresponding to the first satellite signal sample, and then calculate phase values corresponding to the other satellite signal samples by sequentially adding the first phase value.

As such, the carrier clock generator 303 and the code clock generator 309 first calculate the phase value corresponding to any one of the four satellite signal samples, and then calculate the phase values corresponding to the other satellite signal samples by sequentially adding the calculated phase value. The reason for this is that the Doppler frequency of the four satellite signal samples ranges from −10,000 Hz to +10,000 Hz, and thus the phase change by the Doppler frequency during sampling of the four satellite signals is negligible.

Therefore, the four clock generation operations for the four satellite signal samples are reduced to one clock generation operation. As a result, in the case where the sampling frequency is 16.368 MHz, while the clock generation operation had to be performed 16,368 times in the conventional art, it is performed only 4,092 times in the present invention, and the correlation of 1 ms for one satellite can be completed. Thus, it is possible to reduce the clock frequency by the above-described process.

The integrators 310 integrate the correlation values output from the code mixers 304, 305, 306, and 307 and output the results to the measured value storage unit 239. At this time, the integrators 310 may output the correlation values to the measured value storage unit 239 by performing the integration in the period of the C/A code.

Figure 4:
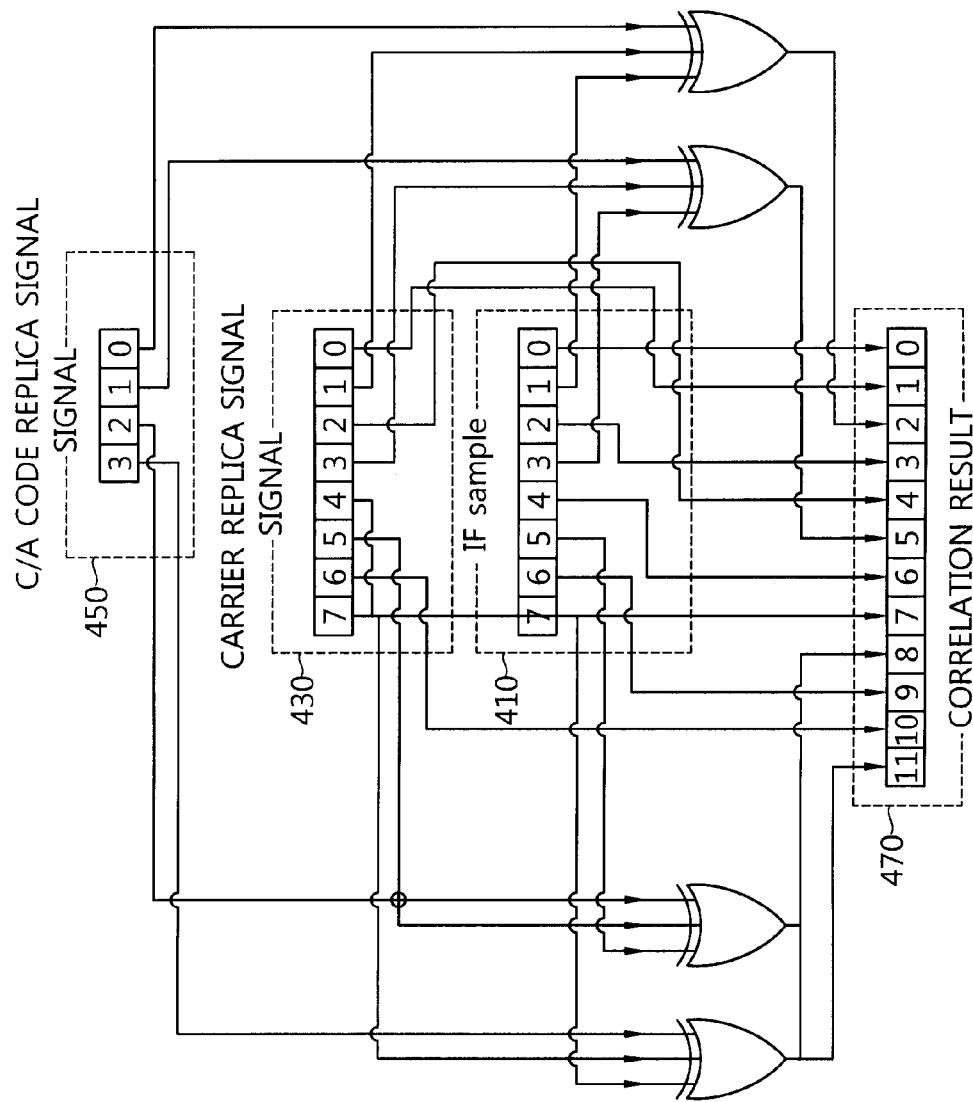
FIG. 4 is a diagram illustrating an operation of the correlator in accordance with an exemplary embodiment of the present invention.

FIG. 4 is a diagram illustrating an operation of the correlator in accordance with an exemplary embodiment of the present invention.

As shown in FIG. 4, when four satellite signal samples of 8 bits, i.e., four IF samples 410, in which each IF sample is 2 bits, are input from the memory buffer 233, the correlator 235 generates carrier replica signals 430 of 8 bits in which 2 bits correspond to one satellite signal sample, and generates C/A code replica signals 450 of 4 bits in which 1 bit corresponds to one satellite signal sample. Then, the correlator 235 mixes the four IF samples 410 input from the memory buffer 233 with the carrier replica signals 430 and the C/A code replica signals 450, and outputs the correlation values 470 of 12 bits.

In FIG. 4, each bit of the C/A code replica signals 450 of 4 bits is a code bit. In the carrier replica signals 430 of 8 bits, 2 bits consisting of 1 code bit and 1 size bit correspond to one IF sample. Thus, an exclusive-OR operation is performed on each code bit of the C/A code replica signals 450, each code bit of the carrier replica signals 430, and each code bit of the IF samples 410 to output 1 bit as the correlation value 470. Each size bit of the carrier replica signals 430 and each size bit of the IF samples 410 are coupled to 2 bits.

Finally, the correlation values 470 are output as a value of 12 bits of four samples, each sample having 1 code bit and 2 size bits.

Figure 5:
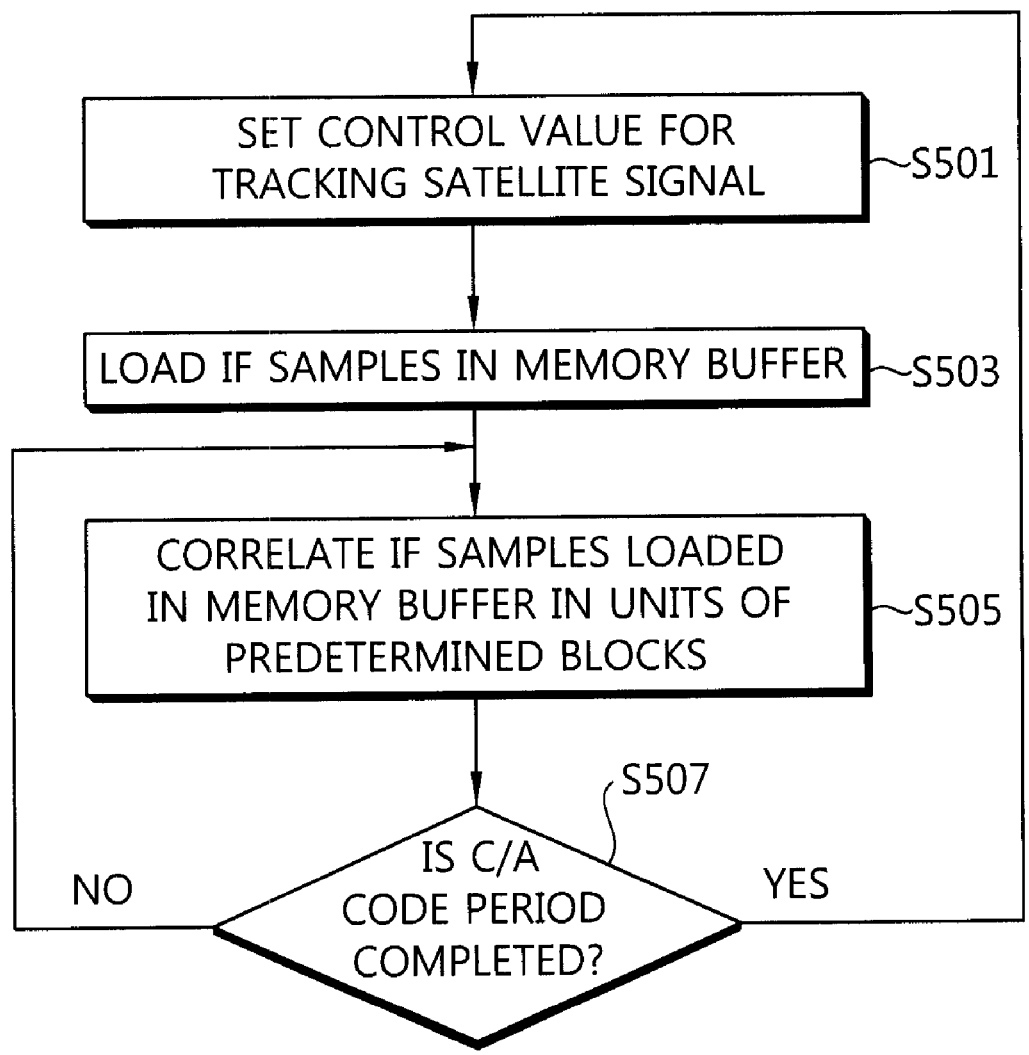
FIG. 5 is a flowchart illustrating an operation of the signal processor in accordance with an exemplary embodiment of the present invention.

FIG. 5 is a flowchart illustrating an operation of the signal processor in accordance with an exemplary embodiment of the present invention.

As shown in FIG. 5, the signal processor 230 sets a control value for tracking a satellite signal (S501). For example, the signal processor 230 may receive the control value for tracking a specific satellite signal from the host controller 250 and store the received control value in the control value storage unit 238. The control value may include a memory buffer control value with information for setting the unit of processing and the unit of storage of the memory buffer 233 and a correlator control value for controlling the clock generator.

Then, the signal processor 230 loads the IF samples, i.e., the satellite signal samples input from the RF unit 210, in units of predetermined blocks in the memory buffer 233 according to the predetermined control value (S503). For example, the controller 231 of the signal processor 230 may load the satellite signal samples of 2 bits input from the RF terminal in units of four samples (i.e., in units of 8 bits) in the memory buffer 233 according to the control value stored in the control value storage unit 238.

Next, the signal processor 230 calculates correlation values in units of blocks for the satellite signal samples loaded in the memory buffer 233 and stores the calculated correlation values in the measured value storage unit 239 (S505). At this time, the correlator 235 of the signal processor 230 may request and receive a predetermined number of satellite signal samples from the memory buffer 233 and calculate the correlation values by performing correlation for the predetermined number of satellite signal samples at a time.

For example, the correlator 235 may request and receive the samples in units of four satellite signal samples (i.e., 8 bits) from the memory buffer 233, mix the carrier replica signals and the C/A code replica signals with the received samples in units of four satellite signal samples, and integrate the resulting values to calculate the correlation values. At this time, the digital clock generator of the correlator 235 may first calculate a phase value corresponding to any one of the four satellite signal samples, which is the unit of processing, and then calculate phase values corresponding to the other three satellite signal samples by sequentially adding the calculated phase value corresponding to the first satellite signal sample. Thus, the clock generation operation for processing the four satellite signal samples is reduced to ¼. The thus calculated correlation values are stored in the measured value storage unit 239.

When the correlation values are calculated and stored, the host controller 250 determines whether the satellite signal correlation of 1 ms corresponding to the period of the C/A code is completed (S507) and, when the satellite signal correlation is completed, the control value for tracking the other satellite signal is calculated and stored in the control value storage unit 238 of the signal processor 230 (S501). Then, the above-described steps S503 to S507 are performed again, and these processes are repeated until the satellite signal correlation of all satellites is completed. Therefore, it is possible to track the signals transmitted from all satellites using the single correlator 235.

As described above, the signal processor 230 in accordance with an exemplary embodiment of the present invention uses the high-performance correlator 235 capable of operating at a speed at least several times faster than the sampling frequency, and performs the correlation in units of predetermined blocks, e.g., in units of four satellite signal samples. That is, the signal processor 230 processes the satellite signal samples in units of one to several milliseconds at a time. Thus, compared to the conventional parallel correlators that perform the correlation in units of one sample, it is possible to significantly reduce the number of correlators without a difference in processing speed, and it is possible to improve resource efficiency.

For example, conventionally, 12 correlators are required to track 12 satellite signals; however, according to the present invention, the single correlator can process all 12 satellite signals with the same processing speed. In this case, the high-speed correlator has to operate at a speed 12 times faster than the sampling frequency in order to process the 12 satellite signals at the same speed as the signal processor including 12 parallel correlators. However, as mentioned above, the correlation is performed in units of, for example, four satellite signal samples at a time in the present invention, and thus the clock frequency can be reduced to ¼. Therefore, if the high-speed correlator can operate at a speed about 3 times faster than the sampling frequency, it is possible to ensure the same processing speed as the conventional signal processor. Moreover, while all signal channels are processed asynchronously in the conventional parallel correlator structure, the correlator 235 in accordance with the present invention can process all signal channels synchronously.

While exemplary embodiments of the present invention have been shown and described in detail, it will be appreciated by those skilled in the art that various changes can be made to the exemplary embodiments without departing from the spirit and scope of the invention defined by the claims and their equivalents.

What is claimed is:

1. A signal processing apparatus comprising:
    a first storage unit storing satellite signal samples;
    a correlator receiving the satellite signal samples stored in the first storage unit in units of at least two satellite signal samples and performing correlation, wherein the correlator comprises a clock generator generating a carrier replica signal, the clock generator first calculating a phase value corresponding to any one of the at least two satellite signal samples, and then calculating phase values corresponding to the other satellite signal samples using the calculated phase value to generate the carrier replica signals corresponding to the at least two satellite signal samples; and
    a controller storing the satellite signal samples received from an RF terminal in the first storage unit and controlling the correlator based on a predetermined control value.

2. The apparatus of claim 1, wherein the clock generator generates the carrier replica signals using the calculated phase values corresponding to the satellite signal samples and a starting phase value set by the controller.

3. The apparatus of claim 1, wherein the clock generator calculates the phase values corresponding to the other satellite signal samples by sequentially adding the calculated phase value corresponding to any one of the satellite signal samples.

4. The apparatus of claim 1, wherein the correlator comprises:
    a clock generator generating a code clock signal; and
    a pseudo noise code generator generating a pseudo noise code replica signal using the code clock signal generated by the clock generator and a starting phase value set by the controller.

5. The apparatus of claim 4, wherein the clock generator first calculates a phase value corresponding to any one of the at least two satellite signal samples, and then calculates phase values corresponding to the other satellite signal samples using the calculated phase value to generate the code clock signal.

6. The apparatus of claim 5, wherein the clock generator calculates the phase values corresponding to the other satellite signal samples by sequentially adding the calculated phase value corresponding to any one of the satellite signal samples.

7. The apparatus of claim 1, further comprising a second storage unit storing the control value input from an external controller.

8. The apparatus of claim 7, wherein the control value comprises:
    information for setting units of processing and units of storage of the first storage unit; and
    information for controlling the clock generator included in the correlator to track signals transmitted from a plurality of satellites.

9. The apparatus of claim 1, wherein the controller changes a satellite signal channel of the correlator in each period of a pseudo noise code.

10. The apparatus of claim 1, wherein the first storage unit comprises a plurality of memory buffers temporarily storing the satellite signal samples alternately in each period of a pseudo noise code.

11. A signal processing method comprising the steps of:
    setting a control value for tracking a signal of a satellite;
    storing satellite signal samples received from an RF terminal in a buffer in units of at least two satellite signal samples based on the control value;
    performing correlation by outputting the satellite signal samples in units of at least two satellite signal samples from the buffer; and
    changing a signal channel upon completion of the correlation to track a signal of another satellite;
    wherein the step of performing the correlation comprises the steps of:
        generating a clock signal for the at least two satellite signal samples output from the buffer;
        generating a carrier replica signal and a pseudo noise code replica signal based on the generated clock signal; and mixing the generated carrier replica signal and pseudo noise code replica signal with the at least two satellite signal samples and integrating the mixed signal.

12. The method of claim 11, wherein the step of setting the control value comprises the step of storing information, received from an external controller, for setting units of processing and units of storage of the buffer and information for the correlation in a storage unit.

13. The method of claim 11, wherein the step of generating the clock signal comprises the steps of:
   calculating a phase value corresponding to any one of the at least two satellite signal samples; and
   calculating phase values corresponding to the other satellite signal samples using the calculated phase value.

14. The method of claim 11, further comprising the step of:
   repeating the step of setting the control value, the step of storing the satellite signal samples, the step of performing the correlation, and the step of changing the signal channel, while changing a signal channel for each satellite, in order to track signals of all satellites.

* * * * *